Figure 4:
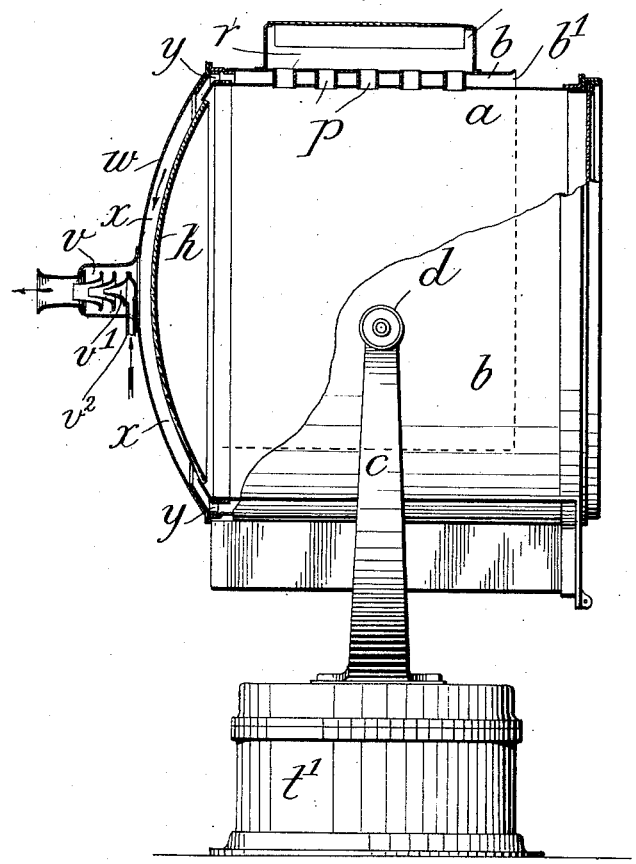

W. M. MORDEY.
ELECTRICAL SEARCHLIGHT AND OTHER PROJECTOR.
APPLICATION FILED JUNE 2, 1920.
1,382,215.
Patented June 21, 1921.
2 SHEETS—SHEET 1.
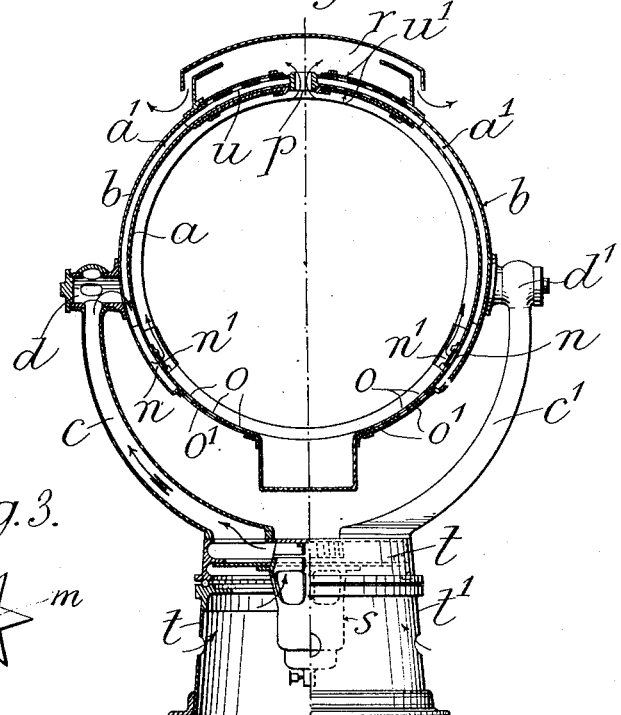
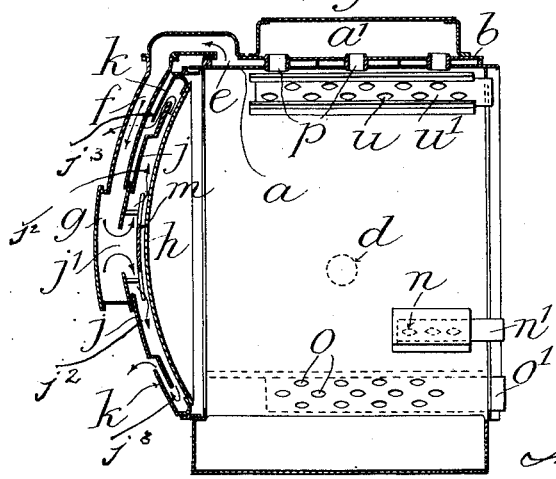
Inventor.
William M. Mordey
By Julian C. Dowell
his attorney W. M. MORDEY.
ELECTRICAL SEARCHLIGHT AND OTHER PROJECTOR.
APPLICATION FILED JUNE 2, 1920.

1,382,215.

Patented June 21, 1921.

UNITED STATES PATENT OFFICE.

WILLIAM MORRIS MORDEY, OF WESTMINSTER, ENGLAND, ASSIGNOR TO HIMSELF, AND GWYLIM ANWYL HUGHES, OF CROYDON, ENGLAND.

ELECTRICAL SEARCHLIGHT AND OTHER PROJECTOR.

1,382,215.     Specification of Letters Patent.     Patented June 21, 1921.

Application filed June 2, 1920. Serial No. 386,031.

*To all whom it may concern:*

Be it known that I, WILLIAM MORRIS MORDEY, a subject of the King of Great Britain and Ireland, residing at the city of Westminster, England, have invented Improvements in or Relating to Electrical Searchlights and other Projectors, of which the following is a specification.

This invention relates to electrical searchlight and other projectors of various types particularly those using heavy currents.

One of the principal parts of such a searchlight or projector that requires special protection is the mirror and the present invention has for its object to provide an improved cooling arrangement for the projector casing and mirror.

According thereto, a jacket surrounds, partly or wholly, the casing or barrel of the projector and the back of the mirror and is so constructed that air will be caused to flow more or less around the casing or barrel of the projector and, after being warmed thereby, will come in contact with the mirror thus preventing overheating of the latter without incurring the risk of cracking which would result if cold air were used for the purpose. Means are provided for causing air to flow in the desired path for the purpose mentioned.

When an electric or other fan, blower or equivalent device (hereinafter referred to as a draft inducer) is employed, it may conveniently be placed in the pedestal or support of the projector in which case it may be attached to the projector base so as to rotate with the projector. The supporting arms for the projector trunnions, or one of them may be made hollow and preferably of larger size than usual to act as air ducts, or as an air duct, to the jacket. The draft inducer may however be otherwise arranged.

Perforations may be provided in the projector casing or barrel for allowing a certain amount of air to flow through the interior of the projector.

Means are provided for controlling the direction of flow of air to those parts of the projector that most need cooling, such as the mirror. The jacket may be provided with sliders or dampers or equivalent means for such controlling purposes.

In the accompanying illustrative drawings,

Figure 1 shows partly in front elevation and partly in transverse section and diagrammatically, and Fig. 2 in central longitudinal section, one construction of projector according to the invention.

Figure 5:
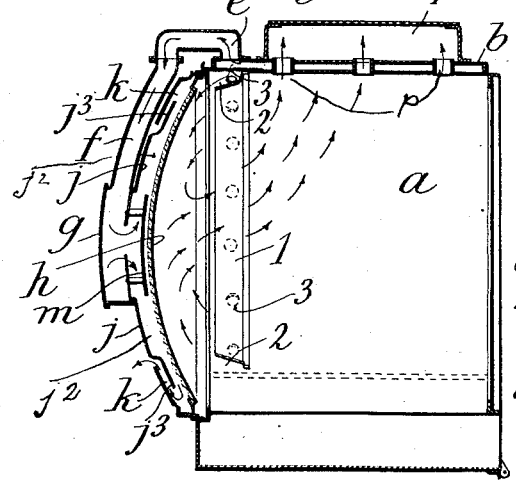

Fig. 3 is a detail view of the reflector projector plate. Fig. 4 shows partly in side elevation and partly in central longitudinal section a modified construction. Fig. 5 is a similar view to Fig. 2 showing another modified construction.

In the example shown in Figs. 1 and 2, the inner barrel $a$ or casing of the projector is partly inclosed in an outer barrel $b$ which forms a jacket or shell covering the parts of the inner barrel most subject to heating. Into this jacket, air under a small pressure is admitted by way of the hollow arms $c, c^1$ and the hollow trunnions $d, d^1$. The air, for the most part, is distributed through the jacket from the trunnions $d$ and $d^1$, leaving the jacket by the opening $e$ (Fig. 2) and passing down the hollow trunk or air duct $f$ to a central chamber $g$ behind the mirror $h$ and its back covering plates $j$ and $k$. Through the central opening $j^1$ the warm air from the jacket impinges on a protecting plate $m$, which is preferably deeply slit, star shape, as shown in Fig. 3, the air then passing radially over the back of the mirror through the chamber $j^2$ so as to cool the mirror uniformly from the center toward its periphery and escaping by the annular opening $j^3$ between the plates $j$ and $k$, as shown by the arrows.

As will be seen, by the arrangement described the air flowing over and against the back of the mirror will have become warm by flowing through the portion of the jacket surrounding the barrel $a$, thus enabling the mirror to be cooled without risk of cracking it, as might be the case with a current of cold air.

A certain amount of air is admitted to the inner barrel $a$ partly for cooling purposes and partly to insure the removal of smoke or fumes from the carbon or other electrodes or other source of light used. This air may either enter from the jacket, for example by side openings $n, n$, which may conveniently be controlled by sliding shutters $n^1$; or it may enter from the outer air by the openings $o \; o$ which are controlled by sliding shutters $o^1$ or, as shown, by both of such openings. The air may leave the barrel $a$ by openings $p, p$ into a cowl $r$ and thence pass to the external atmosphere.

Openings $u, u$ through both the inner and outer barrels $a$ and $b$ are provided and controlled by sliding shutters $u$ to allow of ordinary ventilation of the inner barrel, in conjunction with the openings $o, o$ in the event of interruption, from any cause, of the supply of air to the jacket.

The air under pressure for admission to the jacket may be provided in any convenient way and from any suitable source. Thus, for example, as shown in Fig. 1, it may be supplied by an electrically driven fan $s$ suspended from the upper rotary part $t$ of the projector pedestal $t^1$, thus making a self contained apparatus.

In the arrangement shown in Fig. 4 air is induced to flow through the outer barrel or jacket $b$ of the projector and over the mirror $h$ by a draft inducer $v$ of the injector type the central nozzle $v^1$ of which is supplied with compressed air from any suitable source, the compressed air entering the central nozzle $v^1$ through the inlet $v^2$. $w$ is a plate arranged at the back of the mirror $h$ so as to form therewith a chamber $x$ that is in communication through openings $y$ with the barrel or jacket $b$. Air enters the outer barrel or jacket at its front end $b^1$, which is left open, and after flowing through the barrel $b$ and becoming warmed by contact with the inner barrel $a$, flows through the openings $y$ into the chamber $x$ and radially over the back of the mirror $h$ so as to cool the latter uniformly from its periphery toward its center, the air being drawn in the direction indicated, by the action of the draft inducer $v$.

In some cases the projector casing may be provided with means for causing air warmed in the jacket thereof to flow over the front surface of the mirror while warm air also flows over the back of the mirror.

Fig. 5 shows an arrangement of this kind wherein the barrel $a$ of the projector is provided internally with a curved deflecting plate 1 arranged to form with the said barrel, a surrounding space 2 that is in communication with the jacket $b$ through opening 3 so that warm air can, as indicated by the arrows, flow therefrom and impinge against the front surface of the mirror $h$, the air afterward flowing off through the openings $p$ into the cowl $r$. In other respects the construction of the projector may, as shown, be similar to that illustrated in Figs. 1 and 2.

What I claim is:—

1. An electrical light projector, comprising a casing, a jacket for said casing, tubes connecting the upper portions of the casing and jacket for exit of warm air from the interior of the casing, a reflector arranged at and connected to the rear end of said casing, a chamber arranged behind said reflector and in communication with the rear upper end portion of the interior of said jacket and having an exit for warm air, said casing having at its rear upper and side portions, openings through which warm air can enter the interior of the casing in front of the reflector, means for forcing air through said jacket chamber and openings, and means for deflecting the air issuing through said opening in an inward radial direction over the front of said reflector simultaneously with the flow of air over the back of the reflector.

2. An electrical light projector, comprising a casing, a jacket for said casing, tubes connecting the upper portions of the casing and jacket for exit of warm air from the interior of the casing, a reflector connected at its periphery to the rear end of said casing, the rear end portion of said casing having a series of air exit openings therethrough forward of said reflector, a chamber at the rear of said reflector having a central air inlet and peripheral air outlet, a conduit connecting the central air inlet to the rear upper portion of said jacket, air deflecting means carried by said casing and arranged to direct air issuing through said openings over the front of the reflector and means for causing air to flow through said jacket, chamber and openings so that warm air will flow in an outward radial direction over the back of the reflector while warm air will flow in an inward radial direction over the front of the reflector.

3. An electrical light projector, comprising a casing, a mirror reflector, a jacket for said casing through which cooling air can flow in contact with said casing, a chamber arranged behind said reflector and having a central air inlet and a peripheral air outlet, a conduit connecting the central air inlet to the jacket and air deflecting means arranged within said chamber opposite said central air inlet and adapted to distribute the incoming air rapidly over the back of the reflector.

4. An electrical light projector, comprising a casing, a mirror reflector, a jacket for said casing through which cooling air can flow, a chamber behind the reflector having an air outlet, a conduit connecting such chamber to the jacket and a protecting plate located in the chamber behind the reflector upon which air from the jacket is caused to impinge before encountering the reflector.

5. An electrical light projector, comprising a casing having openings therein near to its rear upper and side portions through which air can enter it, a mirror reflector, a jacket for said casing through which air can flow and become heated and pass through said openings into the interior of said casing and a curved air deflecting device arranged within said casing adjacent to the perforated rear upper and side portions thereof so as to form therewith a narrow space into which air will flow through said openings and from which it will be directed on to the peripheral portion of the front surface of the reflector.

6. An electrical light projector comprising an inner barrel having openings into its interior, a jacket to said barrel into which cooling air can flow, a deflecting plate within said barrel adapted to deflect air passing through said openings over the front surface of the mirror, a chamber at the back of the mirror connected to said jacket and having an outlet for air and means for distributing air entering said chamber over the back of said mirror.

7. An electrical light projector, comprising a casing, a mirror reflector, a jacket for said casing through which cooling air can flow, a chamber behind the reflector embodying overlapping plates arranged so that an annular opening for the escape of air is provided, a conduit connecting such chamber to the jacket, and a protecting plate located in the chamber behind the reflector and adapted to divert the flow of air radially toward the annular air escape opening aforesaid, substantially as described.

8. In an electrical light projector embodying a casing, a mirror reflector and connected cooling jackets for said casing and mirror, a hollow base, a fan therein and hollow means supporting the jacket from and placing the interior of the jacket in communication with the base whereby air under pressure will be delivered into and through the jackets.

Signed at London, England, this 17th day of May, 1920.

WILLIAM MORRIS MORDEY.